United States Patent
Ma

(10) Patent No.: US 10,530,636 B2
(45) Date of Patent: Jan. 7, 2020

(54) LINK MANAGEMENT METHOD, DEVICE AND SYSTEM IN VIRTUAL MACHINE ENVIRONMENT

(71) Applicant: ZTE Corporation, Shenzhen (CN)

(72) Inventor: Lijun Ma, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 230 days.

(21) Appl. No.: 15/537,227

(22) PCT Filed: Feb. 27, 2015

(86) PCT No.: PCT/CN2015/073368
§ 371 (c)(1),
(2) Date: Jun. 16, 2017

(87) PCT Pub. No.: WO2016/095341
PCT Pub. Date: Jun. 23, 2016

(65) Prior Publication Data
US 2017/0346680 A1    Nov. 30, 2017

(30) Foreign Application Priority Data
Dec. 16, 2014   (CN) .......................... 2014 1 0785426

(51) Int. Cl.
*H04L 12/24*       (2006.01)
*H04L 12/709*      (2013.01)
(Continued)

(52) U.S. Cl.
CPC ...... *H04L 41/0668* (2013.01); *H04L 41/0803* (2013.01); *H04L 45/245* (2013.01); *H04L 45/28* (2013.01); *H04L 47/125* (2013.01)

(58) Field of Classification Search
CPC ............. H04L 41/0668; H04L 41/0803; H04L 45/245; H04L 45/28; H04L 47/125;
(Continued)

(56) References Cited

U.S. PATENT DOCUMENTS 8,315,156 B2    11/2012  Droux
2010/0115174 A1*  5/2010  Akyol ................... G06F 13/385
                                                710/316
(Continued)

FOREIGN PATENT DOCUMENTS

CN       103336708 A     10/2013

OTHER PUBLICATIONS

International Search Report for corresponding application PCT/CN2015/073368 filed on Feb. 27, 2015; dated Sep. 11, 2015.
(Continued)

*Primary Examiner* — Ivan O Latorre
(74) *Attorney, Agent, or Firm* — Cantor Colburn LLP

(57) ABSTRACT

At least some embodiments of invention provide a method, device and system for link management in a Virtual Machine (VM) environment. The method includes: a heartbeat handshake link is established with a VM. After the heartbeat handshake link is successfully established, Link Aggregation Control Protocol (LACP) state information of a Physical Function (PF) of a plurality of a Network Interface Cards (NICs) is acquired. The LACP state information is sent to the VM through the heartbeat handshake link.

17 Claims, 6 Drawing Sheets

(51) Int. Cl.
*H04L 12/703* (2013.01)
*H04L 12/803* (2013.01)

(58) Field of Classification Search
CPC ....... H04L 69/32; H04L 67/145; H04L 69/14; G06F 9/45558; G06F 2009/45595; Y02D 50/30
See application file for complete search history.

(56) References Cited

U.S. PATENT DOCUMENTS

| | | |
|---|---|---|
| 2011/0022695 A1 | 1/2011 | Dalal |
| 2012/0002535 A1 | 1/2012 | Droux |
| 2012/0005521 A1* | 1/2012 | Droux ................. G06F 11/2005 714/4.11 |
| 2012/0102217 A1* | 4/2012 | Cardona ............. G06F 9/45558 709/235 |
| 2012/0284712 A1* | 11/2012 | Nimmagadda ....... G06F 9/5077 718/1 |
| 2014/0108584 A1 | 4/2014 | Lu |
| 2014/0185627 A1 | 4/2014 | Ditya |
| 2014/0250338 A1 | 9/2014 | Prabhakaran |
| 2015/0263937 A1* | 9/2015 | Macchiano ............. H04L 45/22 709/223 |
| 2016/0212094 A1* | 7/2016 | Luo ....................... H04L 12/467 |

OTHER PUBLICATIONS

European Search Report ffor corresponding application EP15868858; Report dated Nov. 7, 2017.

\* cited by examiner

LINK MANAGEMENT METHOD, DEVICE AND SYSTEM IN VIRTUAL MACHINE ENVIRONMENT

TECHNICAL FIELD

The invention relates to the field of communications, and in particular to a link management method, device and system in a virtual machine (VM) environment.

BACKGROUND

In conventional Information Technology (IT) network equipment, in order to reduce complexity in management over at least one network interface of a server and also along with increase of a network interface bandwidth requirement of application software, multiple external network interfaces of the server usually aggregate multiple Physical Functions (PFs) into an aggregate port for an Operation System (OS) and an upper-layer service to use by adopting a Link Aggregation Control Protocol (LACP).

In a non-virtualized host OS, an 802.3ad LACP runs to automatically complete negotiation and management of multiple ports connected with a switch side. In a VM environment, network card equipment realizes multiple Virtual Functions (VFs) by virtue of an Input/Output (I/O) virtualization technology such as Single Root I/O Virtualization (SR-IOV) or a Virtual Machine Device Queue (VMDq). A certain number of VFs are allocated to each VM according to a requirement. Requirements of all of multiple VMs on running the 802.3ad LACP for respectively mounted VFs cause an LACP state machine chaos of a switch side and make an LACP state machine impossible to implement a link aggregation negotiation process.

In a typical networking example, a server has two physical network cards A and B respectively connected with Ethernet switch ports PA and PB which support an LACP. Two VFs named after VF1 and VF2 are configured by the network card A of the server by SR-IOV. Two VFs named after VF3 and VF4 are also configured by the network card B of the server. Two VMs VM1 and VM2 are started on the server. The VF1 and the VF3 are allocated to the VM1, the VF2 and the VF4 are allocated to the VM2, and then network traffic of the two VMs is finally connected to a switch through two PFs. Such networking implements load sharing of the two ports in the VMs in a static switch configuration manner. Otherwise, the LACP simultaneously runs in the VM1 and the VM2. LACP data unit protocol messages of the two VMs simultaneously negotiate with an LACP of a switch, and at this moment, negotiation fails.

If a method for static switch configuration is adopted in the VM environment, there is a shortcoming as follows.

There is no full-path detection mechanism from VFs to an external switch. Once a link failure occurs, it is impossible to determine whether a reason is a problem of the VFs in VMs or a problem from external physical links to the switch, so that difficulties in failure processing are increased.

Besides static switch configuration, a method which is commonly used at present also includes that:

PFs managed by a host OS run an LACP and construct a physical aggregation group. VFs managed by a guest OS construct a virtual LACP aggregation group. State information of the physical aggregation group is synchronized to the virtual aggregation group. The virtual aggregation group manages the VFs according to protocol state information of the physical aggregation group. No practical LACP negotiation process is required on VMs, but there is also no full-path detection mechanism from the VFs to an external switch.

From the above, it can be seen that both of the two methods have a problem of incapability in implementing full-path detection of network links of VMs, thereby causing a condition of packet loss of an LACP aggregation group of the VMs when internal VFs are abnormal.

SUMMARY

At least some embodiments of invention provide a link management method, device and system in a VM environment, so as at least to partially solve a problem of how to implement full-path detection of network links of VMs.

In order to solve the technical problem, at least some embodiments of the invention provide the following technical solutions.

A link management method in a VM environment includes:

establishing a heartbeat handshake link with a VM; after the heartbeat handshake link is successfully established, acquiring Link Aggregation Control Protocol (LACP) state information of a Physical Function (PF) of each of a plurality of Network Interface Cards (NICs); and sending the LACP state information to the VM through the heartbeat handshake link.

In one embodiment, the heartbeat handshake link is established between the PF and a plurality of Virtual Functions (VFs) of each of the plurality of NICs on a basis of a shared communication queue mechanism, wherein the plurality of VFs are provided for the VM by the plurality of NICs.

In one embodiment, each of the plurality of VFs of the VM is respectively provided by each of the plurality of NICs.

Another link management method in a VM environment includes:

establishing a heartbeat handshake link with a host; after the heartbeat handshake link is successfully established, detecting whether Link Aggregation Control Protocol (LACP) state information of a Physical Function (PF) of each of a plurality of Network Interface Cards (NICs) is received from the host or not; and controlling a link between each of at least one VM and each of a plurality of Virtual Functions (VFs) according to a detection result.

In one embodiment, a total number of the plurality of the NICs is two; before establishing the heartbeat handshake link with the host, further including: communicating with outside by virtue of two VFs of two NICs.

In one embodiment, after establishing the heartbeat handshake link with the host, the method further includes: before detecting that the host completes LACP negotiation, controlling the two VFs of two NICs in an active-standby working mode.

In one embodiment, controlling the link between the VM and the VF according to the detection result includes: when the at least one of the plurality of VFs run in a load sharing aggregation mode and the received LACP state information is an LACP negotiation completion state, enabling the VF corresponding to a PF in a normal state, and causing the VF in an enabled state to run in a load sharing mode; or when the at least one of the plurality of VFs run in an active-standby mode, selecting a VF corresponding to the PF in the normal state as an active port, and determining other ones of the plurality of VFs as standby ports.

In one embodiment, controlling the link between the VM and the VF according to the detection result further includes: after receiving the LACP negotiation completion state from any one of the at least one VF, when the LACP negotiation completion state is not received from one or more VFs, determining that the one or more VFs fail; when the failed VFs run in a load sharing aggregation mode and the failed VFs are active VFs, removing the VF which fails from a current load sharing aggregation group, and when the failed VFs recovers a heartbeat and enters a normal LACP state, re-adding the failed VFs into the load sharing aggregation group; and when the failed VFs run in the active-standby mode, initiating VF port active-standby switching to select a next available VF port to be active.

A link management device in a VM environment includes:

a first establishment component to establish a heartbeat handshake link with a VM; an acquisition component to, after the heartbeat handshake link is successfully established, acquire Link Aggregation Control Protocol (LACP) state information of a Physical Function (PF) of each of a plurality of Network Interface Cards (NICs); and a sending component to send the LACP state information to the VM through the heartbeat handshake link.

In one embodiment, the heartbeat handshake link is established between the PF and a plurality of VFs of each of the plurality of NICs on a basis of a shared communication queue mechanism, wherein the plurality of VFs are provided for the VM by the plurality of NICs.

In one embodiment, each of the plurality of VFs of the VM is respectively provided by each of the plurality of NICs:

Another link management device in a VM environment includes:

a second establishment component to establish a heartbeat handshake link with a host; a detection component to, after the heartbeat handshake link is successfully established, detect whether Link Aggregation Control Protocol (LACP) state information of a Physical Function (PF) of each of a plurality of Network Interface Cards (NICs) is received from the host or not; and a first control component to control a link between each of at least one VM and each of a plurality of Virtual Functions (VFs) according to a detection result.

In one embodiment, the device further includes: a communication component to communicate with outside by virtue of two VFs of two NICs.

In one embodiment, a total number of the plurality of the NICs is two; the device further includes: a second control component to, before detecting that the host completes LACP negotiation, control the two VFs of two NICs to run in an active-standby working mode.

In one embodiment, the control component is arranged to: when at least one of the plurality of VFs run in a load sharing aggregation mode and the received LACP state information is an LACP negotiation completion state, enable the VF corresponding to a PF in a normal state, and cause the VF in an enabled state to run in a load sharing mode; or when the at least one of the plurality of VFs run in an active-standby mode, select a VF corresponding to the PF in the normal state as an active port, and determine other ones of the plurality of VFs as standby ports.

In one embodiment, the control component further includes: a determination element to, after receiving the LACP negotiation completion state from any one of the at least one VF, when the LACP negotiation completion state is not received from one or more VFs, determine that the one or more VFs fail; and a control element to, when the failed VFs run in a load sharing aggregation mode, remove the VF which fails from a current load sharing aggregation group, and when the failed VFs recovers a heartbeat and enters a normal LACP state, re-add the failed VFs into the load sharing aggregation group; and when the failed VFs run in the active-standby mode and the failed VFs are active VFs, initiate VF port active-standby switching to select a next available VF port to be active.

A link management system in a VM environment includes the two abovementioned devices.

According to at least some embodiments of the invention, LACP negotiation of a network card of a server is automatically completed under the condition of not modifying a configuration of an opposite switch. Difficulties in field deployment of equipment are reduced. Heartbeat protection between the host and a VF is implemented through the shared communication mechanism in an NIC. Reliable full-link detection from the VF to the external switch is implemented, and reliability and availability of the system are improved.

In addition, external link state information is sent from the VF to the VM for the VM to regulate the VF aggregation group according to an external link state. And furthermore, the VM detects whether the link state information sent by the VF is received or not to further acquire the link state between the VF and the VM, so that a purpose of automatically regulating the aggregation group is achieved, the condition of communication packet loss is prevented, and data transmission security is ensured.

DETAILED DESCRIPTION

In order to make the purpose, technical solutions and advantages of the invention clearer, the invention will be further described below in detail with reference to the drawings and specific embodiments. It is important to note that the embodiments in the invention and characteristics in the embodiments are freely combined under the condition of no conflicts.

For link aggregation control management of VFs in the VM environment, a method for implementing negotiation management among guest OSs, the VFs, a host OS and PFs is required.

Figure 1:
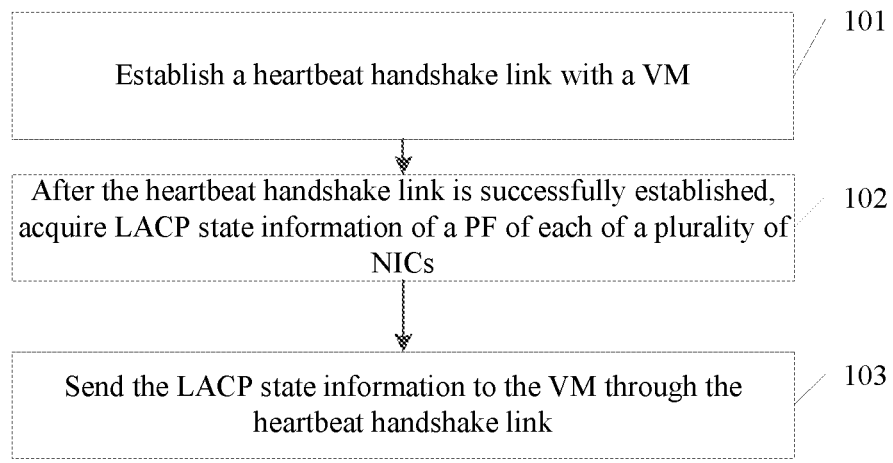
FIG. 1 is a flowchart of a link management method in a VM environment according to an exemplary embodiment of the invention.

FIG. 1 is a flowchart of a link management method in a VM environment according to an exemplary embodiment of the invention. As shown in FIG. 1, the method includes:

At Step 101: a heartbeat handshake link with a VM is established.

At Step 102: after the heartbeat handshake link is successfully established, LACP state information of a PF of each of a plurality of NICs is acquired; and At Step 103: the LACP state information is sent to the VM through the heartbeat handshake link.

Compared with a conventional art where a VF and a PF are required to run the same LACP, the method provided by this exemplary embodiment of the invention has the advantages that the LACP state information of the PF is shared to the VM through the heartbeat handshake link, so that the VF on the VM obtains the LACP state information without running the LACP. And a data basis is provided for global link detection of the VM.

Figure 2:
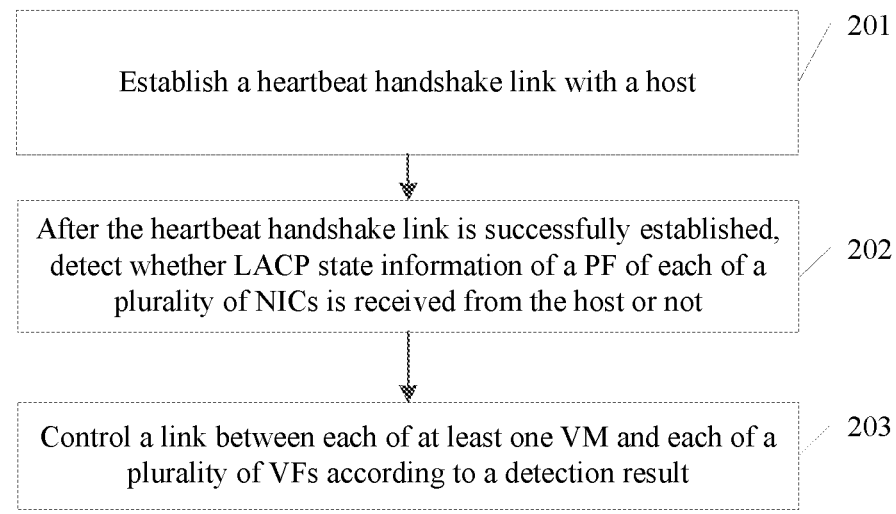
FIG. 2 is a flowchart of another link management method in a VM environment according to an exemplary embodiment of the invention.

FIG. 2 is a flowchart of another link management method in a VM environment according to an exemplary embodiment of the invention. As shown in FIG. 2, the method includes:

At Step 201: a heartbeat handshake link with a host is established.

At Step 202: after the heartbeat handshake link is successfully established, whether LACP state information of a PF of each of a plurality of NICs is received from the host or not is detected.

At Step 203: a link between each of at least one VM and each of a plurality of VFs is controlled according to a detection result.

Compared with the conventional art where a VF and a PF are required to run the same LACP, the method provided by this exemplary embodiment of the invention has the advantages that the LACP state information of the PF is acquired from the host through the heartbeat handshake link, so that the VF on the VM may obtain the LACP state information without running the LACP. And a data basis is provided for global link detection of the VM. In addition, a link condition between the VM and the VF of the VM is acquired by detecting whether LACP information sent by the VF is received or not. Interface switching is implemented when the VF in the VM independently fails, and normal transmission of a data flow is ensured.

The method embodiments provided by the invention will be further described below.

Figure 3:
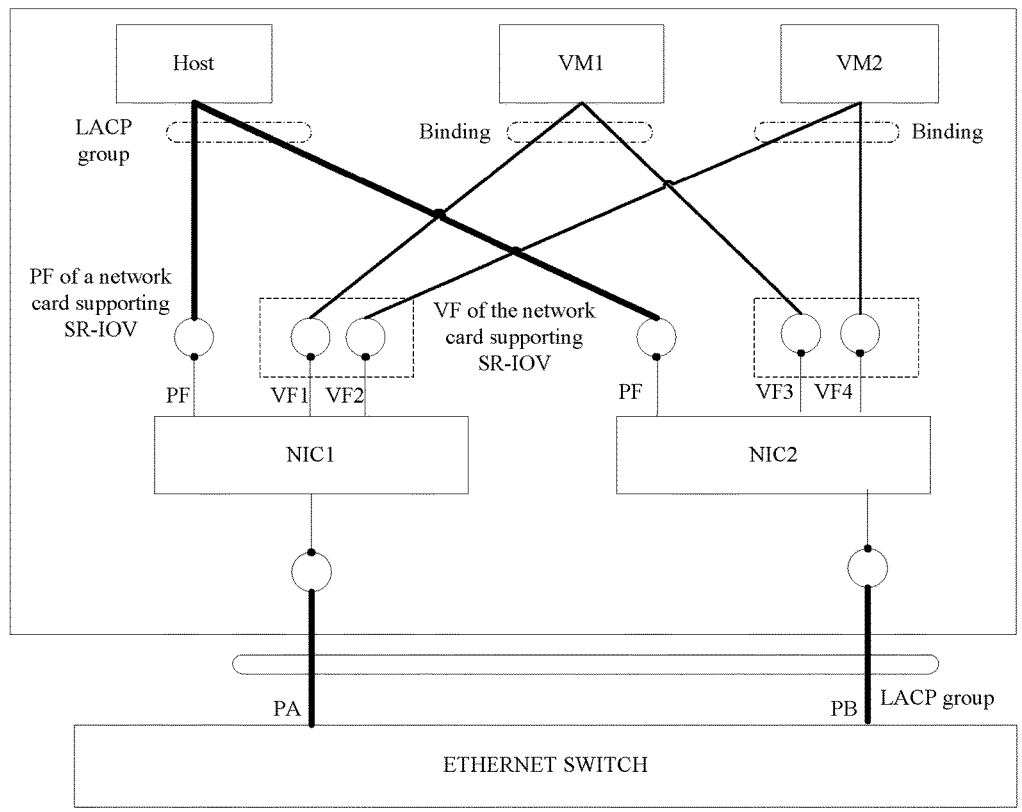
FIG. 3 is a schematic diagram illustrating network connection between a host and VMs according to an exemplary embodiment of the invention.

FIG. 3 is a schematic diagram illustrating network connection between a host and VMs according to an exemplary embodiment of the invention.

A host of a server is installed with two or more NICs supporting an I/O virtualization technology. VMs are provided through a virtualization technology. Guest OSs run on the VMs. Meanwhile, a certain number of Central Processing Unit (CPU) cores are provided for running a host OS. And each guest OS is isolated from the other guest OSs and the host OS.

The NICs provide a VF support for the VMs through the I/O virtualization technology (a typical method is, for example, SR-IOV). The NICs provide required VFs for the VMs through the I/O virtualization technology. And each VM aggregates multiple VFs into a port by adopting a load sharing or active-standby mode. If an SR-IOV technology is adopted, the NICs may simultaneously construct a PF configured to manage the NICs and the VFs. LACP negotiation of an external PF is completed by the host of the server through the PF of the NICs. If a VMDq or another virtualization technology is adopted, one of all the VFs is selected as an external negotiation port, and this port is called as an active VF. For example, when SR-IOV is adopted, the NICs provide one or more PFs, and simultaneously provide multiple VFs. The PFs are used by the host OS, and are mainly configured for own external communication requirement, external PACP management and VF resource management of the host OS. And the VFs are used by the guest OSs on the VMs. In order to improve reliability of communication links, multiple VFs of the same guest OSs are from multiple different NICs respectively. And these VFs construct a bonding port (an aggregate port constructed by multiple network interfaces in the load sharing or active-standby mode) by adopting the load sharing or active-standby mode.

External interfaces of multiple NICs of the server are connected with a standard Ethernet switch or a cluster of multiple switches interconnected by a stacking technology. The NICs and at least one switch construct an aggregate port through an LACP.

In the schematic diagram shown in FIG. 3, the host of the server is connected with two switch ports PA and PB of an external switch by virtue of two NICs in an LACP manner. The ports are managed through the LACP, and the two NICs run in an aggregation group manner. The server provides two VMs and a physical machine. And two physical network cards of the server provide a PF (named after PF1 and PF2 respectively) and two VFs (named after VF1~VF4 respectively) in an SR-IOV manner respectively. The PF1 and the PF2 form an LACP aggregation group, and this aggregation group completes LACP negotiation with the external switch through the physical machine. The VF1 and the VF3 form a load sharing or active-standby aggregation group for the VM1 to use. The VF2 and the VF4 form another load sharing or active-standby aggregation group for the VM2 to use.

In an exemplary embodiment, each of the plurality of VFs of the VM is respectively provided by each of the plurality of NICs. That is, the VM communicates with the outside by virtue of the VFs on the two NICs, so that the other VFs of the VM on the PF which normally works are utilized to continue working when an NIC fails. And normal transmission of a data flow of the VM is ensured.

Figure 4:
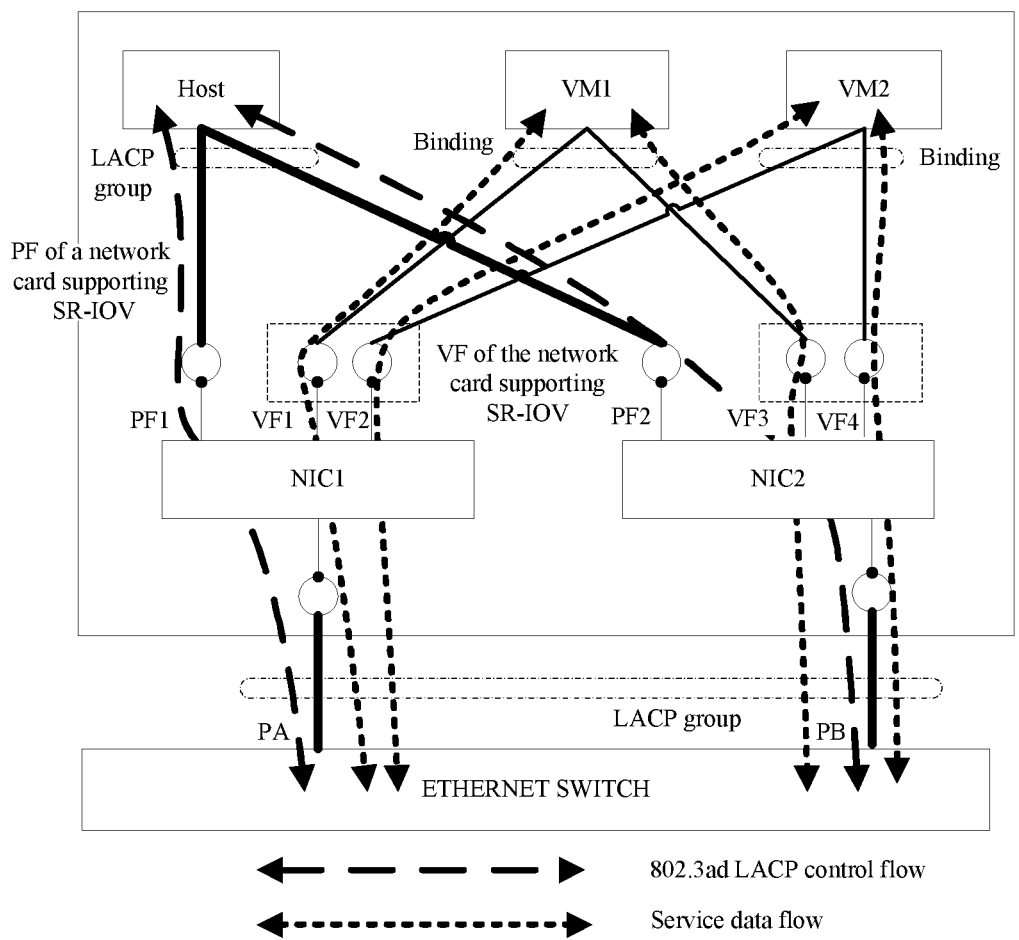
FIG. 4 is a schematic diagram of an LACP control flow and a VM service flow in a connection relationship shown in FIG. 3 according to an exemplary embodiment of the invention.

FIG. 4 is a schematic diagram of an LACP control flow and a VM service flow in a connection relationship shown in FIG. 3 according to an exemplary embodiment of the invention. From the figure, it can be seen that a physical host in a system is required to run the LACP on the aggregation group formed by the PF1 and the PF2. And all the guest OSs which the VF aggregation groups are located at do not run the LACP.

From the schematic diagram shown in FIG. 4, it can be seen that the host still runs the LACP. The VMs perform data transmission without hardware improvement by virtue of the VFs provided by the NICs, and an existing hardware structure is maintained.

Figure 5:
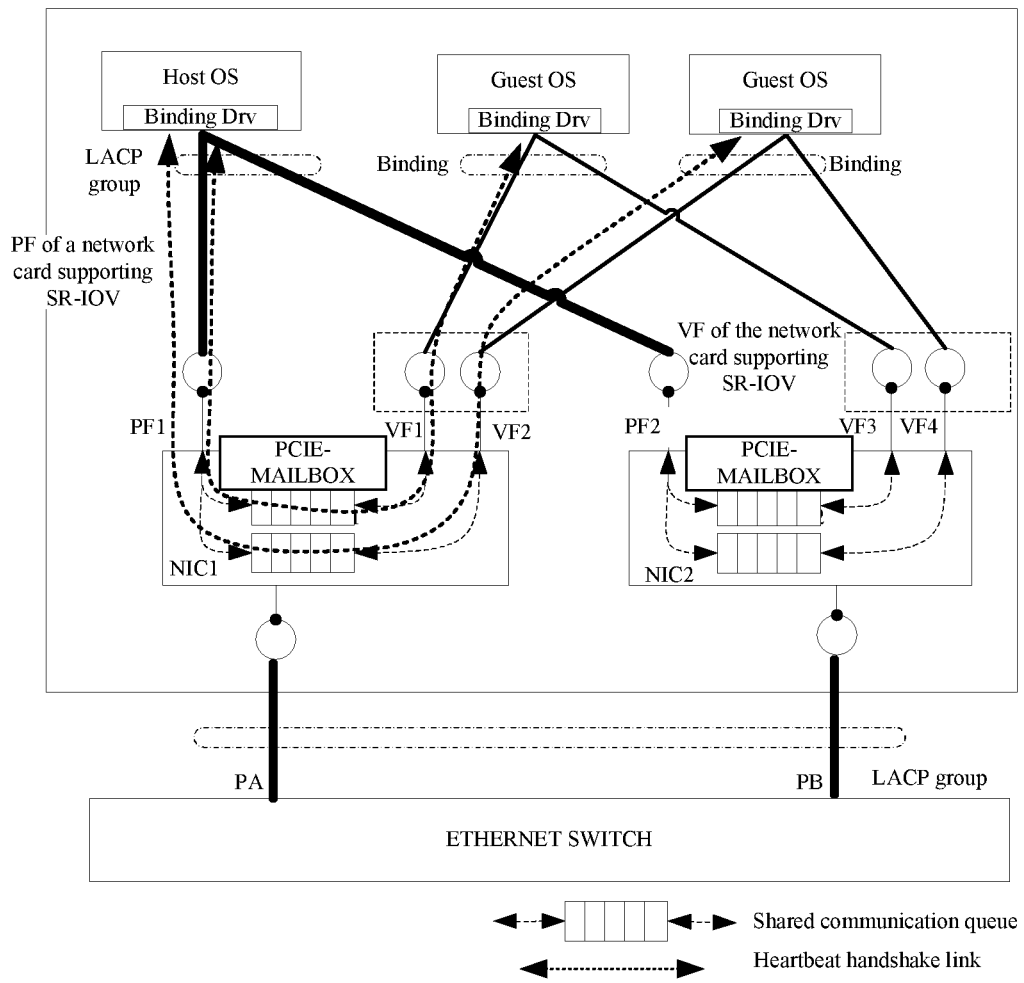
FIG. 5 is a schematic diagram of implementation of information interaction between a host and VMs in a connection relationship through shared communication queues of NICs shown in FIG. 3 according to an exemplary embodiment of the invention.

FIG. 5 is a schematic diagram of implementation of information interaction between a host and VMs in a connection relationship through a shared communication queue of an NIC shown in FIG. 3 according to an exemplary embodiment of the invention. In the schematic diagram shown in FIG. 5, the host OS and the guest OSs establish heartbeat handshake links through shared communication queues, and synchronize PF and VF aggregation states through the links.

Specifically, when the VFs of the NICs are configured on a host OS side, a mailbox mechanism is provided for each VF. And the PFs and the VFs implement information interaction by virtue of the mechanisms. In the invention, the heartbeat handshake links between the host OS and the guest OSs are established by virtue of mailbox functions of the VFs. And two-way handshake and aggregation state synchronization of the host OS and the guest OSs are implemented by virtue of the links.

From FIG. 5, it can be seen that the heartbeat handshake links are established between the PFs on the NICs and the VFs on the basis of shared communication queue mechanisms. The VFs are provided for the VMs by the NICs. And the host shares LACP state information obtained by running the LACP to the VMs through the heartbeat handshake links, so that the VMs acquire external link states and implement full-link detection.

Figure 6:
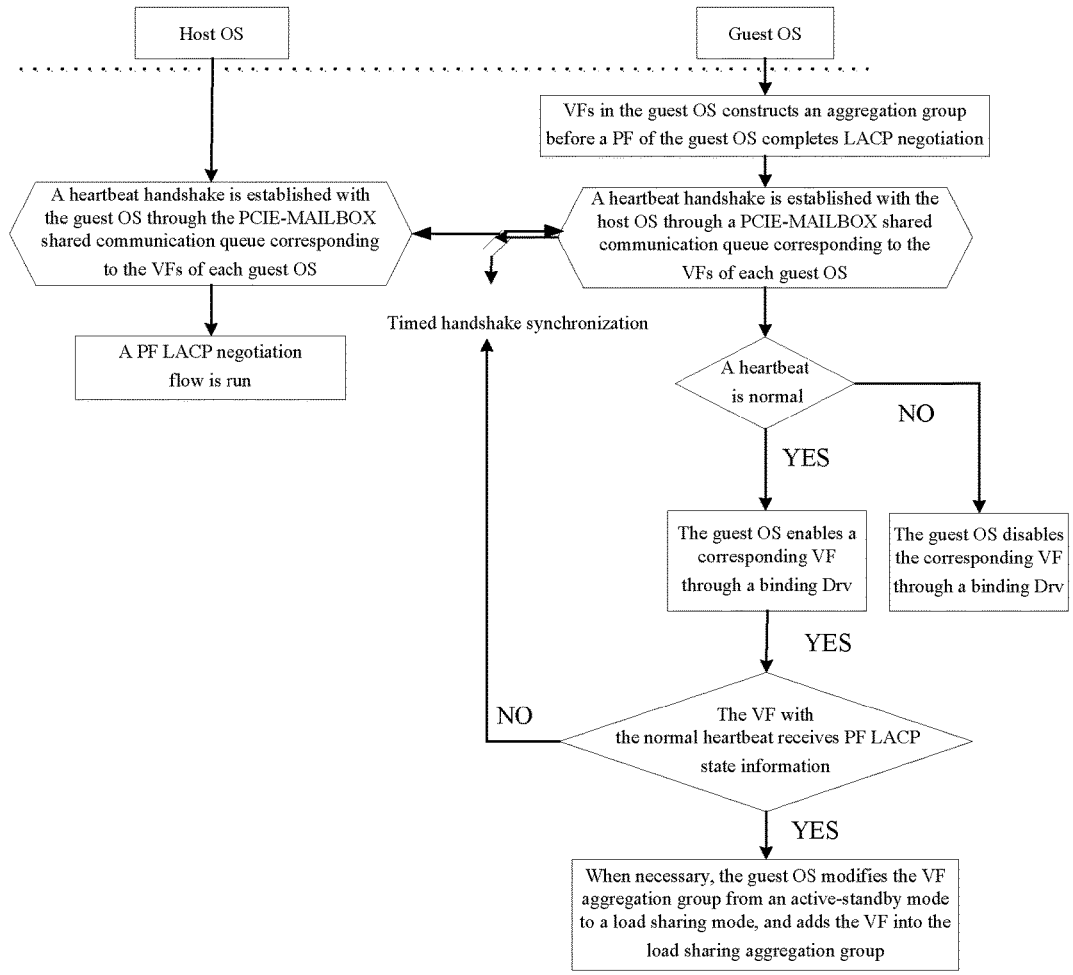
FIG. 6 is a flowchart of establishment of heartbeat handshake links between a host and VMs in a connection relationship shown in FIG. 3 according to an exemplary embodiment of the invention.

FIG. 6 is a flowchart of establishment of heartbeat handshake links between a host and VMs in a connection relationship shown in FIG. 3 according to an exemplary embodiment of the invention.

After the server is successfully started, the host OS and the guest OSs try to establish the heartbeat handshake links through the shared communication queue mechanisms of the NICs at first. And after the links are successfully established, the host OS and the guest OSs synchronize at least one of PF and VF aggregation group state information. And before LACP negotiation of the PF aggregation group is not completed, for avoiding a transmission loop, the two VFs corresponding to the VMs are controlled to run in the active-standby mode, and a basic external communication capability is preserved.

After the heartbeat handshake links are established, on the host OS side, a PF LACP flow is continuously run and an LACP state is synchronized to the guest OSs. And on the guest OS sides, whether the heartbeat handshake link corresponding to each VF is normal or not is continuously checked. The corresponding VF is disabled if the heartbeat handshake link corresponding to each VF is not normal. And if the heartbeat handshake link corresponding to each VF is normal, when the LACP state information of the corresponding PF has been obtained and the guest OS configures the VFs in a load sharing aggregation mode, a VF active-standby mode aggregation group is modified into a load sharing aggregation group at first. And the VF corresponding to the PF is added into or removed from the VF load sharing aggregation group of the guest OS according to whether the corresponding PF is in the LACP aggregation group or not. And if the PF LACP negotiation flow is not completed or the state is not synchronized to the guest OS, the guest OS continues waiting.

Figure 7:
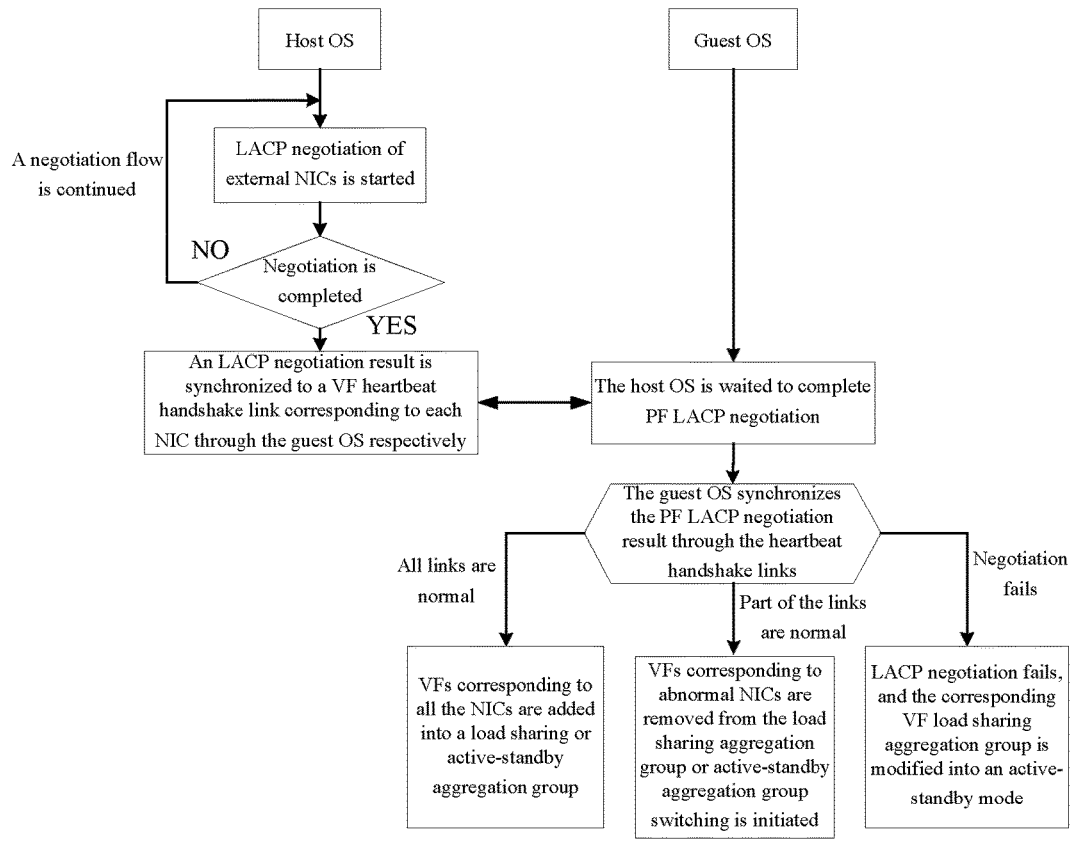
FIG. 7 is a collaboration flow of implementation of LACP and state synchronization between a host and VMs in a connection relationship shown in FIG. 3 according to an exemplary embodiment of the invention.

FIG. 7 is a collaboration flow of implementation of LACP and state synchronization between a host and VMs in a connection relationship shown in FIG. 3 according to an exemplary embodiment of the invention. After the heartbeat handshake links are established, the host starts a PF LACP negotiation flow. The host synchronizes the state to the VFs of the guest OSs of the VMs through the heartbeat handshake links after negotiation is completed. And the host adds or removes the corresponding VFs into or from the VF load sharing aggregation group according to the synchronized PF LACP aggregation group link state. And in case of a PF LACP negotiation failure, the VF aggregation group is re-modified into the active-standby mode to avoid the loop. If the guest OSs configure the VFs in the active-standby mode, when the PF corresponding to the current active VF is abnormal, active-standby VF link switching is initiated, and a next available VF is selected as an active port.

According to the invention, a configuration of the external switch is simplified when the NICs provide the VFs for the VMs under the condition that the NICs support the I/O virtualization technology such as SR-IOV or the VMDq. And the LACP negotiation flow is migrated to the PFs, and the two-way heartbeat handshake links are established on the basis of the mailbox communication mechanisms of the NICs, so that dynamic synchronization management of VF states of the VF aggregation group and the PF LACP synchronization group in the host OS may be implemented without running the LACP, and meanwhile. Internal link detection between the VFs and the guest OSs is also implemented.

Figure 8:
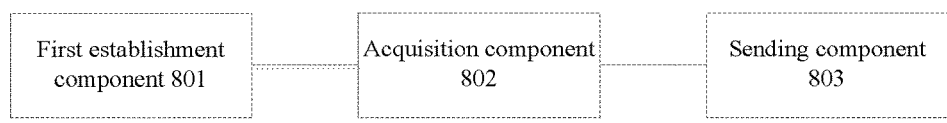
FIG. 8 is a structural block diagram of a link management device in a VM environment according to an exemplary embodiment of the invention.

FIG. 8 is a structural block diagram of a link management device in a VM environment according to an exemplary embodiment of the invention. The schematic diagram shown in FIG. 8 includes:

a first establishment component 801 to establish a heartbeat handshake link with a VM;

an acquisition component 802 to, after the heartbeat handshake link is successfully established, acquire LACP state information of a PF of each of a plurality of NICs and a sending component 803 to send the LACP state information to the VM through the heartbeat handshake link.

In one embodiment, the heartbeat handshake link is established between the PF and a plurality of VFs of each of the plurality of NICs on a basis of a shared communication queue mechanism, wherein the plurality of VFs are provided for the VM by the plurality of NICs.

In one embodiment, each of the plurality of VFs of the VM is respectively provided by each of the plurality of NICs.

Compared with the conventional art where a VF and a PF are required to run the same LACP, the device provided by this exemplary embodiment of the invention has the advantages that the LACP state information of the PF is shared to the VM through the heartbeat handshake link, so that the VF on the VM obtains the LACP state information without running the LACP. And a data basis is provided for global link detection of the VM.

Figure 9:
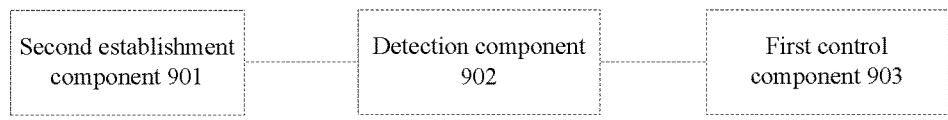
FIG. 9 is a structural block diagram of another link management device in a VM environment according to an exemplary embodiment of the invention.

FIG. 9 is a structural block diagram of another link management device in a VM environment according to an exemplary embodiment of the invention. The schematic diagram shown in FIG. 9 includes:

a second establishment component 901 to establish a heartbeat handshake link with a host;

a detection component 902 to, after the heartbeat handshake link is successfully established, detect whether LACP state information of a PF of each of a plurality of NICs is received from the host or not; and a first control component 903 to control a link between each of a plurality of VMs and each of at least one VF according to a detection result.

In one embodiment, a total number of the plurality of the NICs is two; the device further includes: a communication component to communicate with outside by virtue of two VFs of two NICs.

In one embodiment, the device further includes: a second control component to, before detecting that the host completes LACP negotiation, control the two VFs of two NICs to run in an active-standby working mode.

In one embodiment, the control component is arranged to: when at least one of the plurality of VFs run in a load sharing aggregation mode and the received LACP state information is an LACP negotiation completion state, enable the VF corresponding to a PF in a normal state, and cause the VF in an enabled state to run in a load sharing mode; or when the at least one of the plurality of VFs run in an active-standby mode, select a VF corresponding to the PF in the normal state as an active port, and determine other ones of the plurality of VFs as standby ports.

Optionally, the control component further includes:

a determination element to, after receiving the LACP negotiation completion state from any one of the at least one VF, when the LACP negotiation completion state is not received from one or more VFs, determine that the one or more VFs fail; and a control element to, when the failed VFs run in a load sharing aggregation mode, remove the VF which fails from a current load sharing aggregation group, and when the failed VFs recovers a heartbeat and enters a normal LACP state, re-add the failed VFs into the load sharing aggregation group; and when the failed VFs run in the active-standby mode and the failed VFs are active VFs, initiate VF port active-standby switching to select a next available VF port to be active.

Compared with the where a VF and a PF are required to run the same LACP, the device provided by this exemplary embodiment of the invention has the advantages that the LACP state information of the PF is acquired from the host through the heartbeat handshake link, so that the VF on the VM may obtain the LACP state information without running the LACP. And a data basis is provided for global link detection of the VM. In addition, a link condition between the VM and the VF of the VM is acquired by detecting whether LACP information sent by the VF is received or not. Interface switching is implemented when the VF in the VM independently fails, and normal transmission of a data flow is ensured.

In addition, the invention further provides a link management system in a VM environment, which includes the device shown in FIG. 8 and the device shown in FIG. 9.

According to the at least some embodiments provided by the invention, LACP negotiation of a network card of a server is automatically completed under the condition of not modifying a configuration of an opposite switch. Difficulties in field deployment of equipment are reduced. Heartbeat protection between the host and the VF is implemented through the shared communication mechanism in the NIC. Reliable full-link detection from the VF to the external switch is implemented, and reliability and availability of the system are improved.

Those skilled in the art should know that all or part of the steps of the abovementioned embodiments are implemented by a flow of a computer program, the computer program is stored in a computer-readable storage medium, the computer program is executed on a corresponding hardware platform (such as a system, equipment, a device and an apparatus), and during execution, one or combination of the steps of the method embodiments is included.

Optionally, all or part of the steps of the abovementioned embodiments are also be implemented by an integrated circuit, and these steps may form each integrated circuit component respectively, or multiple components or steps therein may form a single integrated circuit component for implementation. Therefore, the invention is not limited to any specific hardware and software combination.

Each of at least one of device, function component and function element in the abovementioned embodiments is implemented by adopting a universal computing device, and they are concentrated on a single computing device, and are distributed on a network formed by multiple computing devices.

When being implemented in form of software function component and sold or used as an independent product, each of at least one of device, function component and function element in the abovementioned embodiments is stored in a computer-readable storage medium. The abovementioned computer-readable storage medium is a read-only memory, a magnetic disk, an optical disk or the like.

The above are exemplary implementation mode of the invention and not intended to limit the scope of protection of the invention. Any variations or replacements apparent to those skilled in the art within the technical scope disclosed by the invention shall fall within the scope of protection of the invention. Therefore, the scope of protection of the invention shall be subject to the scope of protection of the claims.

INDUSTRIAL APPLICABILITY

As mentioned above, the link management method, device and system in the VM environment provided by at least some embodiments of the invention have the following beneficial effects: LACP negotiation of the network card of the server is automatically completed under the condition of not modifying the configuration of the opposite switch, so that difficulties in field deployment of equipment are effectively reduced. And in addition, heartbeat protection between the host and the VF and reliable full-link detection from the VF to the external switch are implemented through the shared communication mechanism in the NIC. And reliability and availability of the system are further effectively improved.

What is claimed is:

1. A link management method in a Virtual Machine (VM) environment, comprising:
    establishing a heartbeat handshake link with a VM;
    after the heartbeat handshake link is successfully established, acquiring Link Aggregation Control Protocol (LACP) state information of a Physical Function (PF) of each of a plurality of Network Interface Cards (NICs); and
    sending the LACP state information to the VM through the heartbeat handshake link.

2. The method as claimed in claim 1, wherein the heartbeat handshake link is established between the PF and a plurality of Virtual Functions (VFs) of each of the plurality of NICs on a basis of a shared communication queue mechanism, wherein the plurality of VFs are provided for the VM by the plurality of NICs.

3. The method as claimed in claim 2, wherein each of the plurality of VFs of the VM is respectively provided by each of the plurality of NICs.

4. A link management method in a Virtual Machine (VM) environment, comprising:
    establishing a heartbeat handshake link with a host;
    after the heartbeat handshake link is successfully established, detecting whether Link Aggregation Control Protocol (LACP) state information of a Physical Function (PF) of each of a plurality of Network Interface Cards (NICs) is received from the host or not; and
    controlling a link between each of at least one VM and each of a plurality of Virtual Functions (VFs) according to a detection result.

5. The method as claimed in claim 4, wherein a total number of the plurality of the NICs is two;
before establishing the heartbeat handshake link with the host, further comprising:
communicating with outside by virtue of two VFs of two NICs.

6. The method as claimed in claim 5, wherein after establishing the heartbeat handshake link with the host, the method further comprises:
before detecting that the host completes LACP negotiation, controlling the two VFs of two NICs to run in an active-standby working mode.

7. The method as claimed in claim 4, wherein controlling the link between the VM and the VF according to the detection result comprises:
when at least one of the plurality of VFs run in a load sharing aggregation mode and the received LACP state information is an LACP negotiation completion state, enabling the VF corresponding to a PF in a normal state, and causing the VF in an enabled state to run in a load sharing mode; or
when the at least one of the plurality of VFs run in an active-standby mode, selecting a VF corresponding to the PF in the normal state as an active port, and determining other ones of the plurality of VFs as standby ports.

8. The method as claimed in claim 7, wherein controlling the link between the VM and the VF according to the detection result further comprises:
after receiving the LACP negotiation completion state from any one of the at least one VF, when the LACP negotiation completion state is not received from one or more VFs, determining that the one or more VFs fail;
when the failed VFs run in a load sharing aggregation mode, removing the VF which fails from a current load sharing aggregation group, and when the failed VFs recovers a heartbeat and enters a normal LACP state, re-adding the failed VFs into the load sharing aggregation group; and
when the failed VFs run in the active-standby mode and the failed VFs are active VFs, initiating VF port active-standby switching to select a next available VF port to be active.

9. A link management device in a Virtual Machine (VM) environment, comprising:
a first establishment component to establish a heartbeat handshake link with a VM;
an acquisition component to, after the heartbeat handshake link is successfully established, acquire Link Aggregation Control Protocol (LACP) state information of a Physical Function (PF) of each of a plurality of Network Interface Cards (NICs); and
a sending component to send the LACP state information to the VM through the heartbeat handshake link.

10. The device as claimed in claim 9, wherein the heartbeat handshake link is established between the PF and a plurality of VFs of each of the plurality of NICs on a basis of a shared communication queue mechanism, wherein the plurality of VFs are provided for the VM by the plurality of NICs.

11. The device as claimed in claim 9, wherein each of the plurality of VFs of the VM is respectively provided by each of the plurality of NICs.

12. A link management device in a Virtual Machine (VM) environment, comprising:

a second establishment component to establish a heartbeat handshake link with a host;
a detection component to, after the heartbeat handshake link is successfully established, detect whether Link Aggregation Control Protocol (LACP) state information of a Physical Function (PF) of each of a plurality of Network Interface Cards (NICs) is received from the host or not; and
a first control component to control a link between each of at least one VM and each of a plurality of Virtual Functions (VFs) according to a detection result.

13. The device as claimed in claim 12, wherein a total number of the plurality of the NICs is two; the device further comprises:
a communication component to communicate with outside by virtue of two VFs of two NICs.

14. The device as claimed in claim 13, wherein further comprising:
a second control component to, before detecting that the host completes LACP negotiation, controlling the two VFs of two NICs to run in an active-standby working mode.

15. The device as claimed in claim 12, wherein the control component is arranged to:
when the at least one of the plurality of VFs run in a load sharing aggregation mode and the received LACP state information is an LACP negotiation completion state, enable the VF corresponding to a PF in a normal state, and cause the VF in an enabled state to run in a load sharing mode; or when the at least one of the plurality of VFs run in an active-standby mode, select a VF corresponding to the PF in the normal state as an active port, and determine other ones of the plurality of VFs as standby ports.

16. The device as claimed in claim 15, wherein the control component further comprises:
a determination element to, after receiving the LACP negotiation completion state from any one of the at least one VF, when the LACP negotiation completion state is not received from one or more VFs, determine that the one or more VFs fail; and
a control element to, when the failed VFs run in a load sharing aggregation mode, remove the VF which fails from a current load sharing aggregation group, and when the failed VFs recovers a heartbeat and enters a normal LACP state, re-add the failed VFs into the load sharing aggregation group; and when the failed VFs run in the active-standby mode and the failed VFs are active VFs, initiate VF port active-standby switching to select a next available VF port to be active.

17. A link management system in a Virtual Machine (VM) environment, comprising the device as claimed in claim 9 and a link management device in a VM environment device, and the device comprises: a second establishment component to establish a heartbeat handshake link with a host; a detection component to, after the heartbeat handshake link is successfully established, detect whether Link Aggregation Control Protocol (LACP) state information of a Physical Function (PF) of each of a plurality of Network Interface Cards (NICs) is received from the host or not and a first control component to control a link between each of at least one VM and each of a plurality of Virtual Functions (VFs) according to a detection result.

* * * * *